(12) United States Patent
Han et al.

(10) Patent No.: US 10,496,083 B2
(45) Date of Patent: *Dec. 3, 2019

(54) METHOD AND APPARATUS FOR ANALYZING HAZARD, AND COMPUTER READABLE RECORDING MEDIUM

(71) Applicant: Sangmyung University Seoul Industry-Academy Cooperation Foundation, Seoul (KR)

(72) Inventors: Hyuk Soo Han, Seoul (KR); EunBi Kim, Seoul (KR)

(73) Assignee: SANGMYUNG UNIVERSITY SEOUL INDUSTRY-ACADEMY COOPERATION FOUNDATION, Seoul (KR)

( * ) Notice: Subject to any disclaimer, the term of this patent is extended or adjusted under 35 U.S.C. 154(b) by 41 days.

This patent is subject to a terminal disclaimer.

(21) Appl. No.: 15/826,936

(22) Filed: Nov. 30, 2017

(65) Prior Publication Data

US 2018/0107200 A1 Apr. 19, 2018

Related U.S. Application Data

(63) Continuation of application No. PCT/KR2016/012575, filed on Nov. 3, 2016.

(30) Foreign Application Priority Data

Oct. 19, 2016 (KR) .................... 10-2016-0135789

(51) Int. Cl.
*G05B 9/02* (2006.01)
*G05B 23/02* (2006.01)
(Continued)

(52) U.S. Cl.
CPC .......... *G05B 23/0205* (2013.01); *G05B 9/02* (2013.01); *G05B 15/02* (2013.01); *G06F 8/10* (2013.01); *G08B 21/182* (2013.01)

(58) Field of Classification Search
CPC ...... G05B 15/02; G05B 23/0205; G05B 9/02; G08B 21/182; B66B 5/0006;
(Continued)

(56) References Cited

U.S. PATENT DOCUMENTS 7,003,766 B1 2/2006 Hong
7,676,483 B2 * 3/2010 Klug ............... G06Q 10/06
703/6

(Continued)

FOREIGN PATENT DOCUMENTS

KR 20090013281 A 2/2009
KR 20110020520 A 3/2011

OTHER PUBLICATIONS

Korea office action dated May 29, 2017 (Applicant's Notes: This was submitted on Nov. 30, 2017, but Applicant re-submits this in response to Decision on Jan. 18, 2018.).
(Continued)

*Primary Examiner* — Zhipeng Wang
(74) *Attorney, Agent, or Firm* — Dinsmore & Shohl LLP; Yongsok Choi, Esq.

(57) ABSTRACT

A method of analyzing a hazard of a software control system which is operated by a computer and based on STPA (System Theoretic Process Analysis) is provided. The method includes determining an attribute and function demands of the system, analyzing tasks of the system based on the determined attribute and the function demands, generating specification of a relation between the tasks using CTT (Concur Task Tree) method, the CTT method representing a hierarchical relation of a control flow between the (Continued)

tasks, determining at least one of the hazard of the system based on the specification and generating a safety constraint of the system based on the determined hazard. The determining at least one of the hazard of the system uses a guide word mapping table of CTT based STPA.

8 Claims, 10 Drawing Sheets

(51) Int. Cl.
    *G05B 15/02*     (2006.01)
    *G08B 21/18*     (2006.01)
    *G06F 8/10*     (2018.01)

(58) Field of Classification Search
    CPC ........ G06F 11/3668; G06F 8/10; G06F 11/00; G06F 11/36
    See application file for complete search history.

(56) References Cited

U.S. PATENT DOCUMENTS

| | | | | |
|---|---|---|---|---|
| 2007/0074211 A1* | 3/2007 | Klug | ............... | G06Q 10/06 718/100 |
| 2008/0250316 A1* | 10/2008 | Zhang | ............... | G06F 9/451 715/708 |
| 2010/0280855 A1* | 11/2010 | Gupta | ............... | G06F 11/3006 709/223 |
| 2014/0200699 A1* | 7/2014 | Vincelli | ............... | G06F 11/008 700/105 |
| 2016/0266952 A1* | 9/2016 | Hofig | ............... | G06F 11/079 |

OTHER PUBLICATIONS

Minwoo Kim, et al., NuSTPA : A STPA-based safety analysis tool for PPS, Apr. 2016, pp. 64-65, The Institute of Electronics Engineers of Korea.

Fabio Paternò, et al., Concur Task Trees (CTT), W3C Working Group Submission, Feb. 2, 2012, pp. 1-12.

Sungryong Do, et al., Hazard Identification and Testcase Design Method based on Use Case and HAZOP, Journal of KIISE, Jun. 2016, vol. 43, No. 6, pp. 662-667.

Eun Bi Kim, et al., Hazard Analysis Process using CTT-based STPA, Feb. 28, 2016.

Eun Bi Kim, et al., A Hazard Identification Process using STPA based on CTT, Dec. 1, 2015, pp. 511-513, Korea Information Science Society.

Nacny G. Leveson, Engineering a Safer World, Systems Thinking Applied to Safety, 2011, MIT Press.

Nancy Leveson, A New Accident Model for Engineering Safer Systems, paper in Safety Sicence, Apr. 2004, vol. 42, No. 4, pp. 237-270.

Fabio Paternò, et al., ConcurTaskTrees: A Diagrammatic Notation for Specifying Task Models in Human-Computer Interaction INTERACT'97, Jan. 1997, pp. 362-369, Springer US.

Fabio Paternò, ConcurTaskTrees: An Engineered Notation for Task Models, The Handbook of Analysis for Human-Computer Interaction, Lawrence Erlbaum Associates, 2003, pp. 483-500.

Korean Office Action dated May 29, 2017.

English translation of Korea office action dated May 29, 2017.

\* cited by examiner

| TYPE | TASK | EXPLANATION |
| --- | --- | --- |
| Abstract Task | Summon Car | Car is summoned and car is arrived at destination floor |
| | Boarding | Passenger is get into car and load of car is determined whether load of car exceeds restricted load |
| | Take Car to Destination Floor | Destination floor is requested, the car is moved to destination floor |
| | Check Load | Load of car is calculated, alarm is rung when load of car exceeds restricted load |
| Interaction Task | Pressed Summon Button | Summon button is pressed |
| | Pressed Floor Request Button | Floor request button is pressed |
| | Hold Doors | Open status of doors is held by continuously pushing open button or summon button |
| Application Task | Detect Car Position | Present position of car is detected |
| | Calculate Distance | Distance between present position of car and destination floor is calculated |
| | Move Car | Car is moved |
| | Stop Car | Car is stopped (velocity of car is decreased to zero) |
| | Open Doors | Doors are opened |
| | Check Changed Weight | Changed weight is checked when the load of car is changed |
| | Ring Alarm | When total weight exceeds restricted weight, alarm is rung |
| | Close Doors | Doors are closed |
| User Task | Get into Car | Passenger gets into car |
| | Get off Car | Passenger gets off car |

| No. | Control Order | Task (Relation) | Not providing | Providing Causes | (Provide) Too late or Too Early | (Stopped) Too Soon or (Applied) Too long |
|---|---|---|---|---|---|---|
| 1 | Stop | Move Car >> Stop Car | The car is not stopped when the car is arrived at the destination floor. | N/A | The car is stopped before the car is arrived at the destination floor. (the car is stopped between floor and floor) | N/A |
| 2 | Open | Stop Car >> Open Doors | The doors are opened before the car is stopped The doors are not opened when the car is stopped. | N/A | The doors are opened before the car is completely stopped. | N/A |
| 3 | Open | Open Doors >> Get into Car | No hazardous situation | N/A | No hazardous situation | N/A |
| 4 | Open (Hold) | [Hold Doors] ||| Get into Car | The open status of the doors is not held when the passengers get into the car (the hold status is released when boarding) | N/A | N/A | N/A |
| 5 | Load weight | Get into Car ||| Load weight | The load is not checked when the passenger get into the car. | N/A | N/A | N/A |
| 6 | Ring alarm | Check Changed Weight []>> Ring Alarm | The alarm is not rung, although the load of the car exceeds the restricted load. | The alarm is rung due to the erroneous measured value. | No hazardous situation | N/A |
| 7 | Close | Get into Car >> Close Doors | The doors are not closed although all the passengers get into the car. | N/A | The doors are closed when the passenger is getting into the car. | N/A |
| 8 | Close | Load weight >> Close Doors | The doors are closed although the alarm is rung due to the exceeding the restricted load. | N/A | The doors are closed prior to measuring the load of the car. | N/A |
| 9 | Close | Close Doors >> Take Car to Destination Floor | The car is moved to the destination floor without closing the doors | N/A | The car is moved to the destination floor when the doors are not completely closed. | N/A |

FIG. 6

| Control Order | Hazard | Safety Constraint |
|---|---|---|
| Stop | The car is not stopped when the car is arrived at the destination floor. | The car should be stopped when the car is arrived at the destination floor. |
| | The car is stopped before the car is arrived at the destination floor. | The car should not be stopped when the car is moving until the car is arrived at the destination floor. |
| Open | The doors are opened before the car is stopped. The doors are opened before the car is completely stopped. | The doors should not be opened before the car is completely stopped. (The doors should not be opened until the [car speed == 0] |
| | The doors are not opened when the car is stopped. | The doors should be opened when the car is stopped. |
| Open (Hold) | The open status of the doors is not held when the passengers get into the car | The open status of the doors should be held when the passenger is pushing the open button or the summon button. |
| Load weight | The load is not checked when the passenger get into the car. | The load should be checked when the passenger get into the car. |
| | The alarm is not rung, although the load of the car exceeds the restricted load. | The alarm should be rung, when the load of the car exceeds the restricted load. |
| Close | The doors are not closed although all the passengers get into the car. | The doors should be closed when all the passengers get into the car. |
| | The doors are closed when the passenger is getting into the car. | The doors should not be closed when the passenger is getting into the car. |
| | The doors are closed although the alarm is rung due to the exceeding the restricted load. | The doors should not be closed when the load of the car exceeding the restricted load. |
| | The car is moved to the destination floor without closing the doors. The car is moved to the destination floor when the doors are not completely closed. | The car should not be moved to the destination floor until the doors are completely closed. |

| SYMBOL | MEANING |
|---|---|
|  | Abstract Task<br><br>- Superordinate task of the other tasks |
|  | User Task<br><br>- Task operated by the user |
|  | Application Task<br><br>- Task operated by the system |
|  | Interaction Task<br><br>- Task operated by the interaction between the user and the system | ated Art

As IT convergence industry increases, control software is broadly used for various areas. For example, the control software is broadly used for systems requiring safety such as a fighter plane, an aircraft, an automobile and a ship. Accordingly, significant social and economic losses and loss of lives may be occurred due to a trivial defect of the software. Therefore, importance of the hazard analysis of a control software driving system increases.

The hazard analysis means activities for predicting a hazardous situation and preventing accident due to the hazardous situation. For example, the hazard analysis may be a series of processes establishing countermeasures for assuring system safety prior to the accident. The series of the processes may include detecting the hazard causing the accident, determining the detected hazard and analyzing causes of the hazard and scenarios of the accident due to the hazard. As explained above, analyzing the scenarios of the accident due to the hazard and the causes of the hazard is important for the hazard analysis.

FTA and HAZOP which are the methods of analyzing the hazard based on reliability theory using fails of components of the system as the hazard causes have been used to analyze the hazard, conventionally. However, the hazard may be caused not only by the fails of the components but also by interaction between the components and change of external environment. The above mentioned methods of analyzing the hazard may be insufficient to analyze a potential hazard in complex software. The above mentioned methods of analyzing the hazard which are based on the reliability theory may have limit in recent embedded systems including various hardwares and control softwares to form a complex system and having a relatively high potential hazard due to the interaction of the components unlike in conventional systems merely including electromechanical devices which are independently analyzed and having relatively simple interaction between the components.

Thus, to analyze the recent embedded systems, STAMP (system theoretic accident model and processes) which is based on a system theory and STPA (system theoretic process analysis) which is based on STAMP have been used. In the system theory such as STAMP, the components may have constraints. When the components violate the constraints in the system theory such as STAMP, the accident may be detected. In STPA based on STAMP, incomplete control order in the interaction between the components and the hazard due to the incomplete control order are detected, the detected hazard is analyzed to determine safety constraints which are required to control the components and the hazard is prevented by form a system not violating the safety constraints. In STPA, to determine the safety constraints, a control structure map of a target system is generated and the incomplete control orders and the hazards due to the incomplete control orders are detected based on the control orders of a controller which are obtained by the control structure map. However, in STPA, the incomplete control orders and the hazards due to the incomplete control orders are detected dependent on guide words. Thus, the analysis result may be dependent on analyzer's knowledge and experiences so that accuracy and completion of the determined security constraints may not be guaranteed.

METHOD AND APPARATUS FOR ANALYZING HAZARD, AND COMPUTER READABLE RECORDING MEDIUM

CROSS-REFERENCE TO RELATED APPLICATION(S)

This application is a continuation application of PCT/KR2016/012575 filed on Nov. 3, 2016, which claims priority to Korean Patent Application No. 10-2016-0135789 filed on Oct. 19, 2016, the contents of which are herein incorporated by reference in their entireties.

BACKGROUND

1. Field

Exemplary embodiments of the present disclosure relate to hazard analysis of a software control system. More particularly, exemplary embodiments of the present disclosure relate to a method and apparatus for analyzing hazard of the software control system using CTT based STPA.

2. Description of the Rel

CITATIONS (Non Patent Literature 1) Levenson, N. (2011). Engineering a safer world: Systems thinking applied to safety. Mit Press.
(Non Patent Literature 2) Levenson, N. (2004). A new accident model for engineering safer systems. Safety science, 42(4), 237-270.
(Non Patent Literature 3) Paternò, F., Mancini, C., & Meniconi, S. (1997, January). ConcurTaskTrees: A diagrammatic notation for specifying task models. In Human-Computer Interaction INTERACT'97 (pp. 362-369). Springer US.
(Non Patent Literature 4) Paternò, F. (2003). ConcurTaskTrees: an Engineered Notation for Task Models. The Handbook of Analysis for Human-Computer Interaction, Lawrence Erlbaum Associates, 483-500.

SUMMARY

Exemplary embodiments of the present disclosure provide a method of analyzing a hazard for compensating the conventional and incomplete STPA which depends on guide words and for minimizing omission of hazard detection and for increasing accuracy and completion of the hazard analysis.

In an exemplary embodiment of a method of analyzing a hazard of a software control system which is operated by a computer and based on STPA (System Theoretic Process Analysis) according to the present disclosure, the method includes determining an attribute and function demands of the system, analyzing tasks of the system based on the determined attribute and the function demands, generating specification of a relation between the tasks using CTT (Concur Task Tree) method, the CTT method representing a hierarchical relation of a control flow between the tasks, determining at least one of the hazard of the system based on the specification and generating a safety constraint of the system based on the determined hazard. The determining at least one of the hazard of the system uses a guide word mapping table of CTT based STPA.

In an exemplary embodiment, the determining the attribute and the function demands of the system may include generating a use case diagram regarding the attribute and the function demands of the system.

In an exemplary embodiment, the method may further include generating a control structure map of the system based on the attribute and the function demands of the system prior to the analyzing the tasks of the system.

In an exemplary embodiment, the guide word mapping table of the CTT based STPA may include guide words defined by the STPA corresponding to the relation between the tasks which are defined by the CTT method.

In an exemplary embodiment of a hazard analysis apparatus of a software control system which is based on STPA according to the present disclosure, the hazard analysis apparatus includes a demand determining part, a task analyzing part, a specification generating part, a hazard determining part and a safety constraint generating part. The demand determining part determines an attribute and function demands of the system. The task analyzing part analyzes tasks of the system based on the determined attribute and the function demands. The specification generating part generates specification of a relation between the tasks using CTT (Concur Task Tree) method. The CTT method represents a hierarchical relation of a control flow between the tasks. The hazard determining part determines at least one hazard of the system based on the specification. The safety constraint generating part generates a safety constraint of the system based on the determined hazard. The hazard determining part uses a guide word mapping table of CTT based STPA.

In an exemplary embodiment, the demand determining part may generate a use case diagram regarding the attribute and the function demands of the system.

In an exemplary embodiment of a computer readable recording medium comprising at least one command according to the present disclosure, the command implements one of the methods of claims 1 to 6 when the command is operated by a computer.

According to the present disclosure, the conventional and incomplete STPA may be compensated and the task analysis and the specification method using CTT may be added prior to detecting the hazard. Thus, accuracy and completion of the hazard analysis may be increased comparing to the conventional STPA.

BRIEF DESCRIPTION OF THE DRAWINGS

The above and other features and advantages of the present disclosure will become more apparent by describing in detailed exemplary embodiments thereof with reference to the accompanying drawings, in which:

FIG. 6 is a table illustrating determined hazards using guide word mapping table of CTT based STPA using the relations between the tasks of FIGS. 5(a) and 5(b);

FIG. 7 is a table illustrating exemplary safety constraints generated for the elevator control system based on the predicted hazardous situations of FIG. 6 for control orders of the elevator control system; and.

DETAILED DESCRIPTION

The present disclosure now will be described more fully hereinafter with reference to the accompanying drawings, in which exemplary embodiments of the present invention are shown. The present disclosure may, however, be embodied in many different forms and should not be construed as limited to the exemplary embodiments set forth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the disclosure as used herein.

Hereinafter, the present disclosure will be explained in detail with reference to the accompanying drawings.

Figure 1:
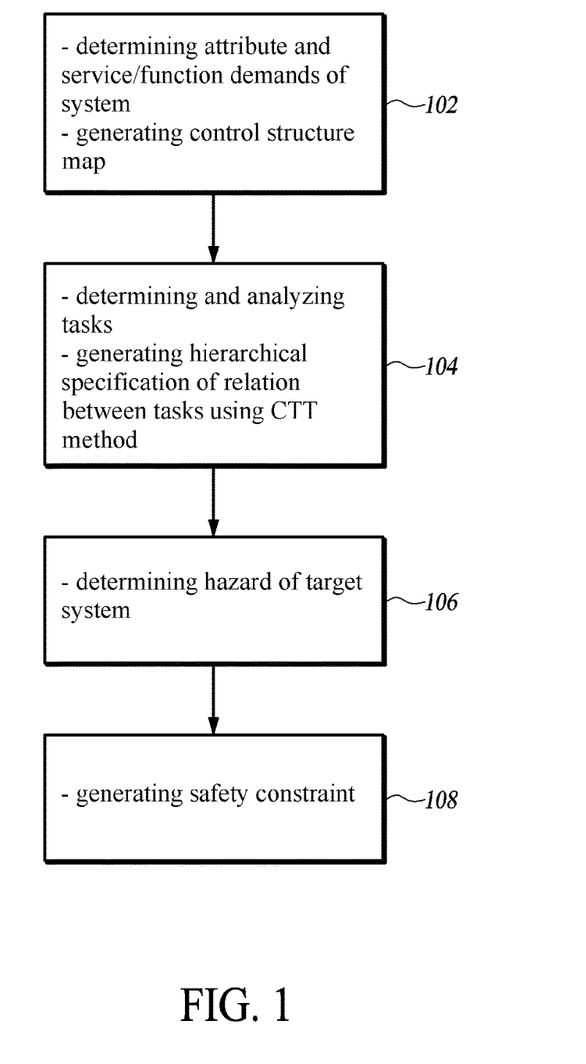
FIG. 1 is a flow block diagram illustrating processes for analyzing a hazard of a software control system according to an exemplary embodiment of the present disclosure.

FIG. 1 is a flow block diagram illustrating processes for analyzing a hazard of a software control system according to an exemplary embodiment of the present disclosure.

Referring to FIG. 1, in a block 102, an attribute (a structure) and service/function demands of a target system are determined and a control structure map of the target system is generated based on the determined demands. According to an exemplary embodiment, a use case diagram may be used to determine the attribute and the service/function demands of the target system. The use case means the service/function demands of the target system which is determined in a viewpoint of a user. The use case diagram is one of specification methods of the system demands. The use case diagram illustrates the use cases, which are the service/function demands of the software control system which is determined in the viewpoint of the user, with attributes related to the use cases such as the user and/or external factors.

When the system demands of the system is illustrated using the use case diagram, the service/function demands of the target system which is determined in the viewpoint of the user and the functions performed by the target system may be clearly determined. Those skilled in the art understand a method of generating the use case diagram so that the detailed explanation regarding the method is omitted.

After the demands of the target system is determined using the use case diagram, the control structure map illustrating operation processes of the target system may be generated based on the demands of the target system. According to the control structure map, input of software of the target system and a sequential flow of data of the target system may be concisely determined. The use case diagram and the control structure map of the target system may be explained referring to FIGS. 2 and 3 in detail.

In a block 104, tasks of the target system are determined and analyzed based on the demands and the control structure map which are determined in the block 102. In the block 104, hierarchical specification of the relation between the tasks is generated using CTT (Concur Task Tree) method. The task means a unit work processed by the system. In CTT, the task means the unit work of a series of works operated in the system by the user. CTT method is used for a customized task modeling for a user interface model based system design. CTT method is used for bidirectional system design between the user and an application. CTT includes relations between the tasks and visualizes characteristics of the tasks of the system and an order (a system working flow) of the tasks in the system flow. In CTT, the tasks are divided into an abstract task which is a superordinate task of the other tasks, a user task which is operated by the user, an application task operated by the system and an interaction task which is operated by interaction between the user and the system according to the characteristics of the tasks.

Figure 9:
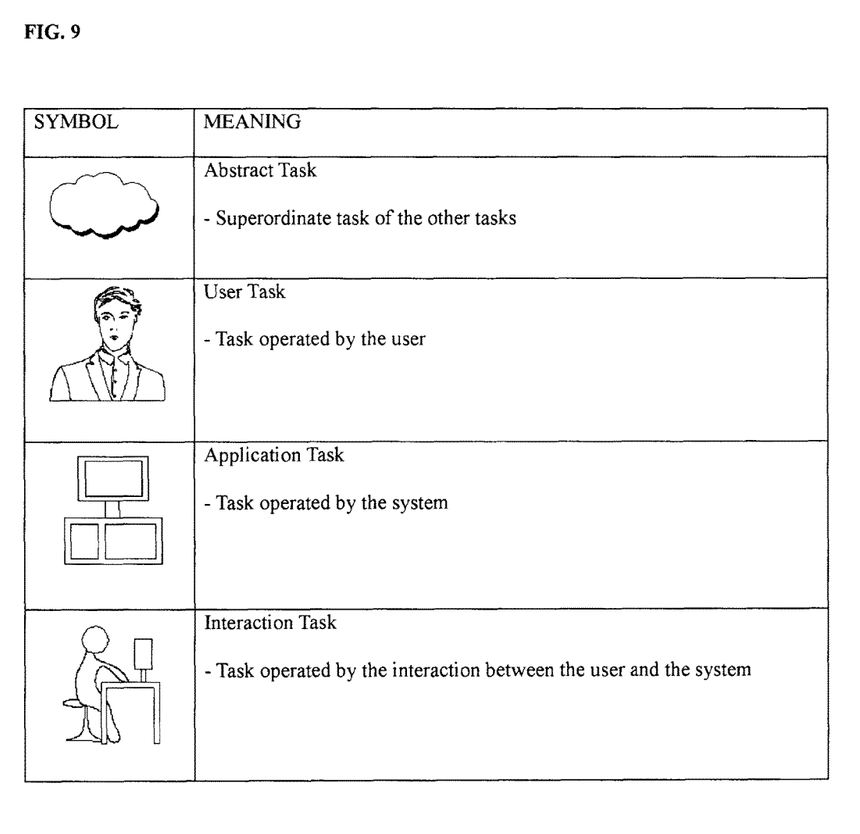
FIG. 9 describes a table including symbols and corresponding meanings thereof.

The four kinds of the tasks shown in FIG. 9 are represented by correlation between tasks T1 and T2 in a following TABLE 2. Accordingly, the system work flow may be easily determined. https://www.w3.org/2012/02/ctt/ may include the detailed explanation of CTT method. The task analysis and the specification method using CTT may be explained referring to FIGS. 4 and 5 in detail.

TABLE 2

| OPERATOR NAME | OPERATOR | MEANING |
| --- | --- | --- |
| Enabling | T1 >> T2 | The second task T2 cannot start until the first task T1 is completed. |
| Choice | T1 [ ] T2 | Two tasks T1 and T2 are all available. However, when one of the two tasks T1 and T2 starts, the other task cannot be performed. |
| Enabling with Information passing | T1 [ ]>> T2 | The second task T2 cannot start until the first task T1 is completed and the information of the first task T1 must be inputted to the second task T2. |
| Concurrent tasks (Interleaving) | T1 ||| T2 | Two tasks T1 and T2 can be performed at any order and one task must be performed until the other task is completed. |
| Concurrent Communication Tasks | T1 |[ ]| T2 | Two tasks T1 and T2 are concurrently performed and the two tasks T1 and T2 can share the information. |
| Task Independence | T1 |=| T2 | Two tasks T1 and T2 can be performed at any order but the two tasks T1 and T2 cannot be concurrently performed. |
| Disabling | T1 [> T2 | When the second task T2 starts, the first task T1 must be inactivated. |
| Suspend-Resume | T1 |> T2 | The first task T1 can be suspended by the second task T2 but the first task T1 cannot be edited by the second task T2. |

In a block 106, the hazard of the target system is determined based on the specification of the tasks generated by the block 104 using CTT. According to an exemplary embodiment, the hazard of the target system may be determined using the guide word mapping table of CTT based STPA as a following TABLE 3. As shown in TABLES 2 and 3, the guide word mapping table of CTT based STPA includes the guide words of the STPA which are applicable to the relation of the tasks of CTT. Herein, the guide words include "Not Providing" which means that a control order to be operated is not operated, "Providing Causes" which means that an inaccurate or unsafe control order is operated, "(Provide) Too Late or Too Early" which means that a control order is operated late or early comparing to a proper time for the control order and "(Stopped) Too soon or (Applied) Too Long" which means that a control order is stopped earlier than a proper time or the control order is applied longer than a proper time. Referring to the guide word mapping table of CTT based STPA, the unsafe control order of the system may be determined and the hazardous situation generated when the tasks (e.g. T1 and T2) are not intentionally performed may be systematically determined.

TABLE 3

| | CTT | | |
|---|---|---|---|
| OPERATOR NAME | | STPA | |
| (OPERATOR) | MEANING | GUIDE WORD | COMMENT |
| Enabling (T1 >> T2) | The second task T2 cannot start until the first task T1 is completed. | Not providing | T1 has a problem and T2 is performed. T1 is performed but T2 is not performed. |
| | | Providing Causes | N/A |
| | | (Provide) Too late or Too Early | T2 starts before the completion of T1. (T1: Too late, T2: Too Early) |
| | | (Stopped) Too Soon or (Applied) Too long | N/A |
| Choice (T1 [ ] T2) | Two tasks T1 and T2 are all available. However, when one of the two tasks T1 and T2 starts, the other task cannot be performed. | Not providing | Both T1 and T2 cannot be performed. Both T1 and T2 are concurrently performed (parallel). |
| | | Providing Causes | N/A |
| | | (Provide) Too late or Too Early | N/A |
| | | (Stopped) Too Soon or (Applied) Too long | N/A |
| Enabling with Information passing (T1 [ ]>> T2) | The second task T2 cannot start until the first task T1 is completed and the information of the first task T1 must be inputted to the second task T2. | Not providing | T1 has a problem and T2 is performed. T1 is performed but T2 is not performed. T2 is performed with missing information. |
| | | Providing Causes | Erroneous information is transmitted. |
| | | (Provide) Too late or Too Early | T2 starts before the completion of T1. (T1: Too late, T2: Too Early) T2 starts before receiving information from T1. |
| | | (Stopped) Too Soon or (Applied) Too long | N/A |
| Concurrent Tasks (Interleaving) (T1 ||| T2) | Two tasks T1 and T2 can be performed at any order and one task must be performed until the other task is completed. (The two tasks can be concurrently performed.) | Not providing | Both T1 and T2 cannot be performed. Only one of T1 or T2 is performed (choice). |
| | | Providing Causes | N/A |
| | | (Provide) Too late or Too Early | N/A |
| | | (Stopped) Too Soon or (Applied) Too long | N/A |
| Concurrent Communication Tasks (Synchronization) (T1 |[ ]| T2) | Two tasks T1 and T2 are concurrently performed and the two tasks T1 and T2 can share the information | Not providing | Both T1 and T2 cannot be performed. Only one of T1 or T2 is performed (choice). The task is performed with missing information. |
| | | Providing Causes | Erroneous information is transmitted to T1 or T2. |
| | | (Provide) Too late or Too Early | The information is transmitted not in time. |
| | | (Stopped) Too Soon or (Applied) Too long | N/A |
| Disabling (T1 [> T2) | When the second task T2 starts, the first task T1 must be inactivated. | Not providing | When T2 is performed, T1 is not inactivated. |
| | | Providing Causes | N/A. |
| | | (Provide) Too late or Too Early | When T2 is performed, T1 is inactivated late (too late). |
| | | (Stopped) Too Soon or (Applied) Too long | N/A |

In a block 108, the safety constraints considering each determined hazard is generated. Herein, the safety constraints means requirements not to be performed in the system unlike conventional software developing requirements.

Hereinafter, the processes of analyzing the hazard of the elevator control system are explained referring to FIGS. 2 to 7 as an example of the processes of analyzing the hazard of the software control system explained referring to FIG. 1. In the present exemplary embodiment, the attributes of the elevator system which is the target system are divided into an internal part and an external part. The external part of the elevator system includes a summon button to summon the elevator. The summon button includes an up button and a down button. The internal part of the elevator system includes a car where passengers board and a door. In the car, a floor request button, an open button and a close button are disposed. The internal part of the elevator system may further include a load sensor to measure the load to be applied to the car.

Figure 2:
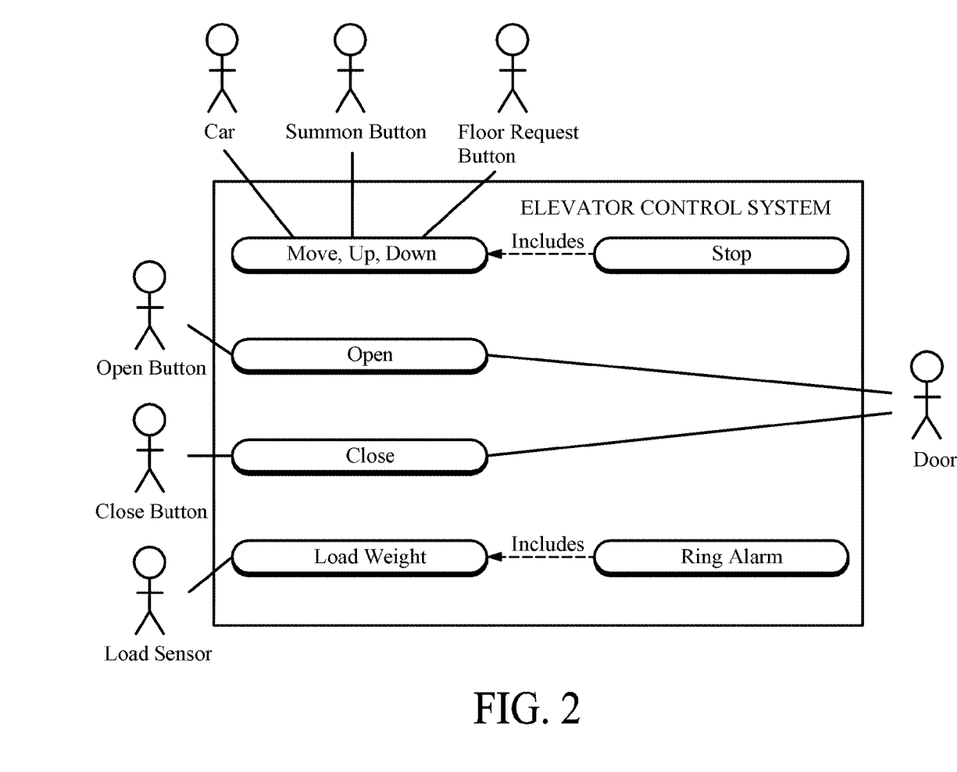
FIG. 2 is a conceptual diagram illustrating a use case diagram of an elevator control system according to an exemplary embodiment of the present disclosure.

FIG. 2 is a conceptual diagram illustrating a use case diagram of an elevator control system according to an exemplary embodiment of the present disclosure.

As explained referring to the block 102 of FIG. 1, for example, the attribute and the service/function demands of the elevator control system are determined using the use case diagram and the control structure map may be generated. FIG. 2 illustrates the use case diagram representing the attributes and the service/function demands of the elevator control system according to the present exemplary embodiment.

Referring to FIG. 2, the services/functions provided by the elevator control system which is the use cases of the elevator control system includes six cases including "Move (Up and Down)" to move the car in an upper direction or in a lower direction, "Stop" to stop the car on a destination floor, "Open" to open the door of the car, "Close" to close the door of the car, "Load Weight" to measure the load applied to the car when the passenger boards on the car to control the load of the car under a restricted load of the car, and "Ring Alarm" to ring an alert alarm when the load of the car exceeds the restricted load of the car. In the use case diagram of FIG. 2, the above explained use cases are represented with the related attributes such as the summon button, the car, the floor request button, the open button, the close button, the load sensor and the door.

Figure 3:
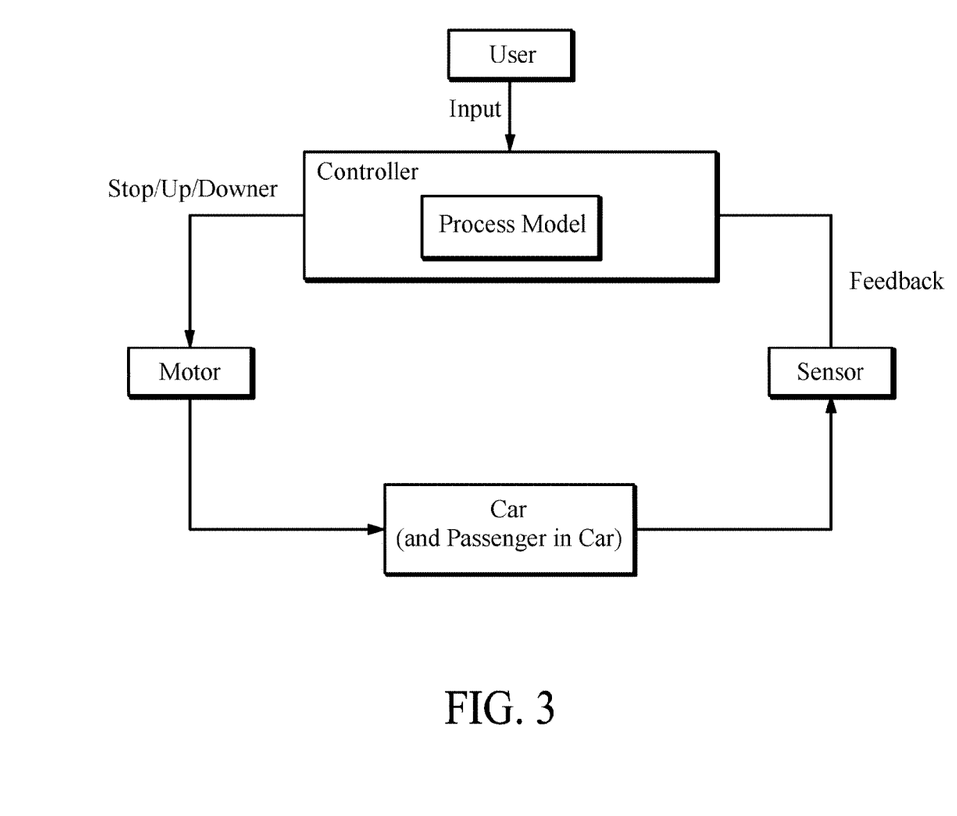
FIG. 3 is a conceptual diagram illustrating a control structure map formed based on the use case diagram of the elevator control system of FIG. 2.

FIG. 3 is a conceptual diagram illustrating the control structure map formed based on the use case diagram of the elevator control system of FIG. 2.

According to an exemplary embodiment, the control structure map may include a user, an input from the user, a controller (a process model), a control order from the controller, an actuator receiving the control order, a processor controlled by the actuator, a sensor sensing the controlled processor and a feedback from the sensor to the controller. For example, referring to FIG. 3 regarding the elevator control system of the present exemplary embodiment, the control structure map represents control flows including transmitting the control order such as Stop, Up or Down from the controller which is generated by the user input to the motor, stopping the car or moving the car in the designated direction by an operation of the motor which receives the control order, and sensing the stop or the movement of the car by the sensor and sending a feedback order from the sensor to the controller.

Figure 4:
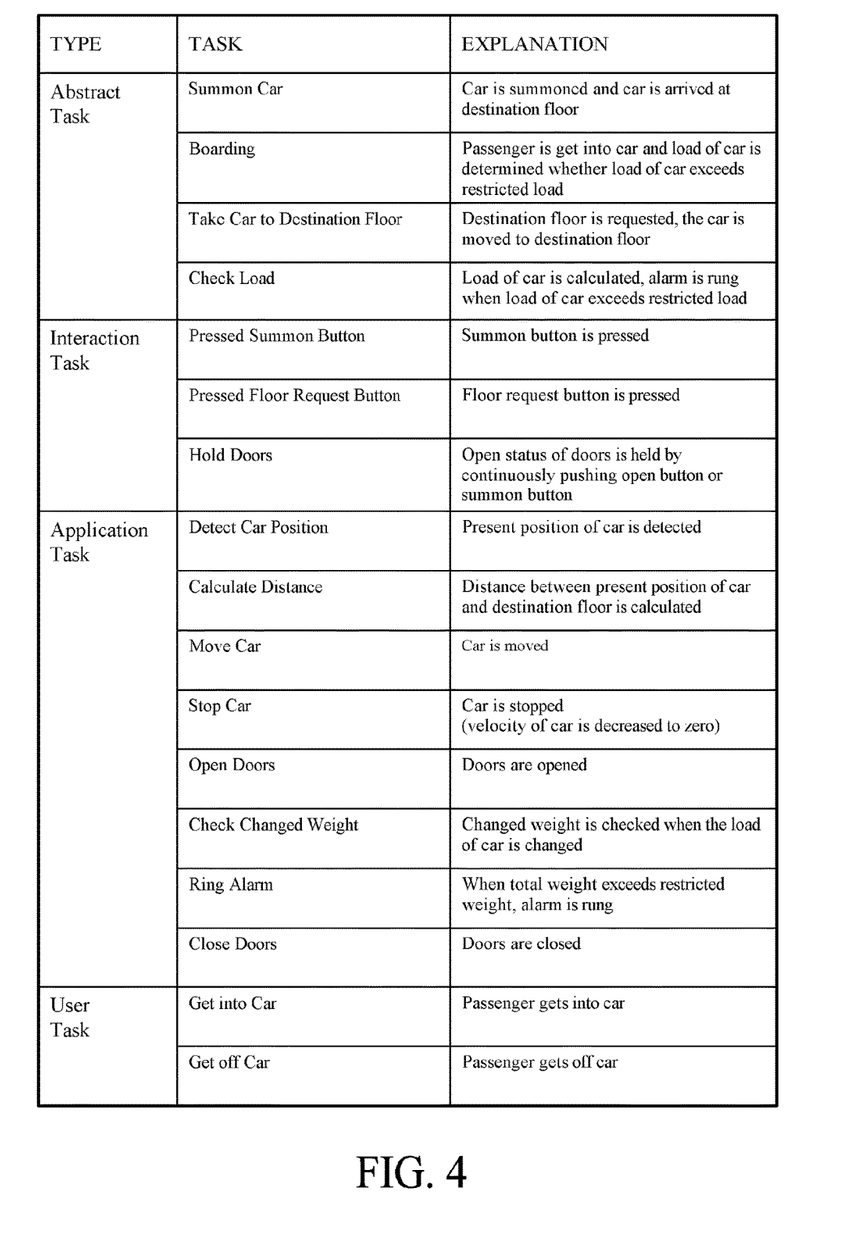
FIG. 4 is a table illustrating exemplary tasks of the elevator control system according to CTT.

FIG. 4 is a table illustrating exemplary tasks of the elevator control system according to CTT.

As explained referring to the block 104 of FIG. 1, to analyze the hazard of the elevator control system, the tasks of the elevator control system are analyzed and the hierarchical specification of the relation between the tasks is generated using CTT. Referring to FIG. 4, four abstract tasks, which are the superordinate tasks of the other tasks, including Summon Car, Boarding, Take Car to Destination Floor and Load weight, three interaction tasks, which are operated by interaction between the user and the system, including Pressed Summon Button, Pressed Floor Request Button and Hold doors, eight application tasks, which are operated by the system, including Detect Car Position, Calculate Distance, Move Car, Stop Car, Open Doors, Check Changed Weight, Ring Alarm and Close Doors and two user tasks, which are operated by the user, including Get into Car and Get off Car are generated.

Figure 5A:
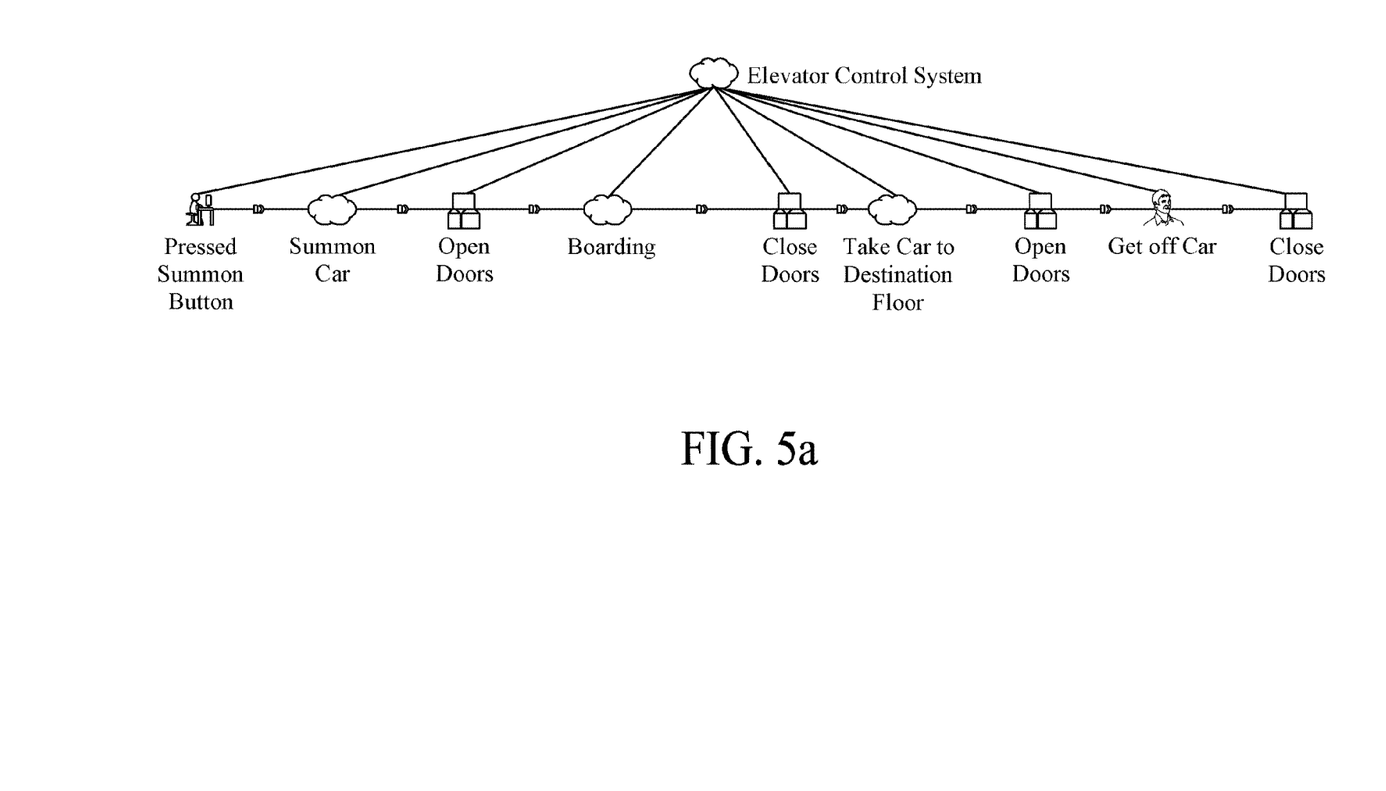
FIGS. 5(a) and 5(b) are conceptual diagram illustrating relations between the tasks of FIG. 4 according to specification according to CTT.
Figure 5B:
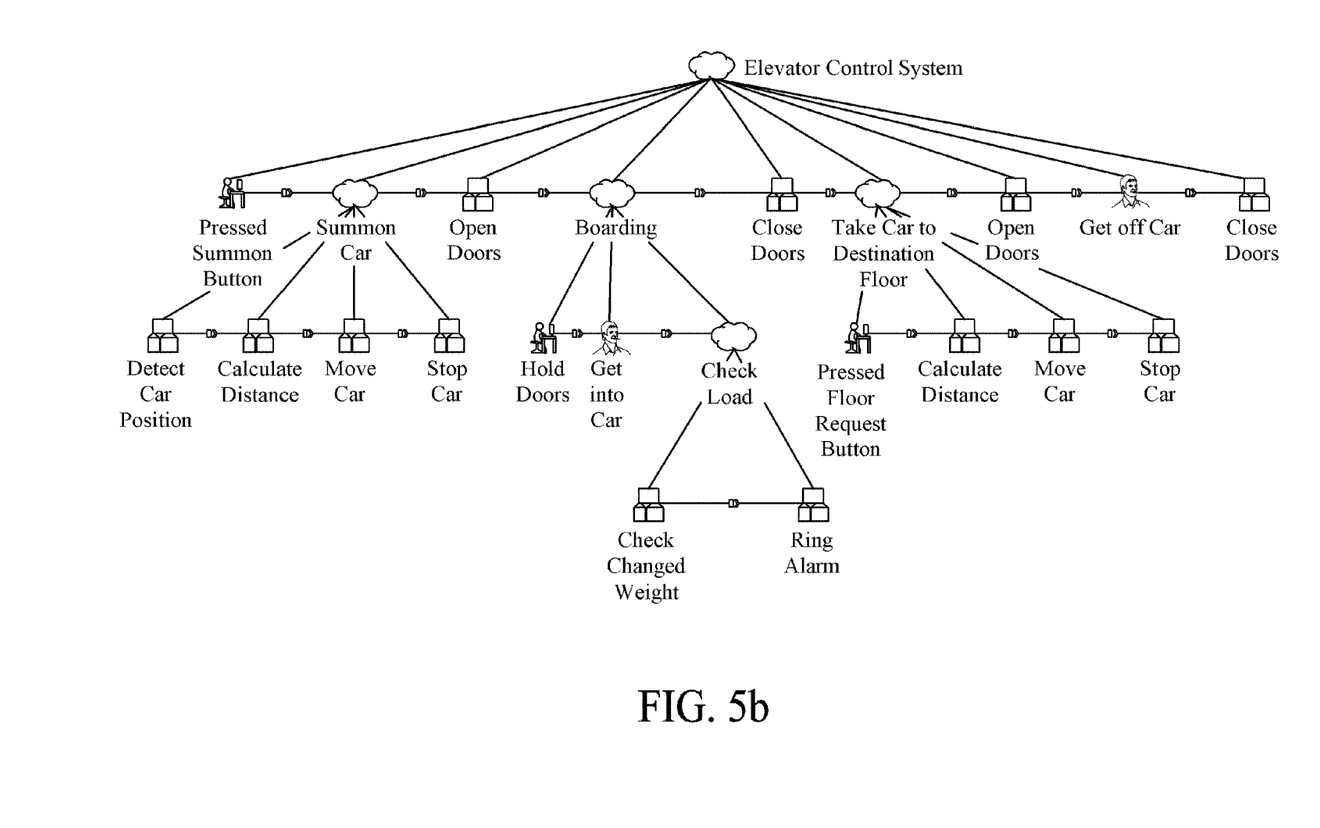

FIGS. 5(a) and 5(b) are conceptual diagram illustrating relations between the tasks of FIG. 4 according to the specification according to CTT. FIG. 5(a) represents the tasks of the elevator control system as a hierarchical structure. FIG. 5(b) represents the tasks of the elevator control system as the hierarchical structure in detail. According to the FIGS. 5(a) and 5(b), the relations between the tasks in the system flow may be easily understandable.

Referring to FIG. 5(a), in the elevator control system operation, Pressed Summon Button task and Summon Car task are occurred. The Pressed Summon Button task and the Summon Car task may have a relation of Enabling with Information passing according to the specification of CTT so that the second task (Summon Car) cannot start until the first task (Pressed Summon Button) is completed and the information of the first task (Pressed Summon Button) must be inputted to the second task (Summon Car).

Referring to FIG. 5(a), after the Summon Car task is performed, Open Doors task is performed and then Boarding task is occurred. After the Boarding task is performed, Close Doors task, Take Car to Destination Floor task, Open Doors task, Get off Car task and the Close Doors task may be sequentially performed. As shown in FIG. 5(a), the above mentioned tasks having the relation of Enabling of CTT so that the second task (Boarding) cannot start until the first task (Open Doors) is completed. Similarly, the Close Doors task cannot start until the Boarding task is completed and the Take Car to Destination Floor task cannot start until the Close Doors task is completed.

Referring to FIG. 5(b), the Summon Car task may be an abstract task including Detect Car Position task to detect a present position of the car, Calculate Distance task to calculate a distance between the present position of the car and the destination floor, Move Car task to move the car and Stop Car task to stop the car at the destination floor. Herein, the Detect Car Position task and the Calculate Distance task may have a relation of Enabling with Information passing according to the specification of CTT so that the Calculate Distance task cannot start until the Detect Car Position task is completed and the information (e.g. the detected present position of the car) of the Detect Car Position task must be inputted to the Calculate Distance task. Similarly, the Calculate Distance task and the Move Car task may have a relation of Enabling with Information passing according to the specification of CTT so that the Move Car task cannot start until the Calculate Distance task is completed and the information (e.g. the distance value) of the Calculate Distance task must be inputted to the Move Car task. The Move Car task and the Stop Car task may have a relation of Enabling so that the Stop Car task cannot start until the Move Car task is completed.

In addition, the Boarding task includes Hold Doors task, Get into Car task and Check Load task. The Hold Doors task, the Get into Car task and the Check Load task may have a relation of Concurrent tasks (interleaving). The tasks in the relation of Concurrent tasks (interleaving) can be performed at any order and other tasks must be performed until one task is completed. More specifically, the Check Load task may include Check Changed Weight task and Ring Alarm task. The Check Changed Weight task and the Ring Alarm task may have a relation of Enabling with Information passing according to the specification of CTT. In addition, the Take Car to Destination Floor task may include Pressed Floor Request Button, the Calculate Distance task, the Move Car task and the Stop Car task. Referring to FIG. 5(b), the Pressed Floor Request Button, the Calculate Distance task and the Move Car task may have a relation of Enabling with Information passing and the Move Car task and the Stop Car task may have a relation of Enabling.

FIG. 6 is a table illustrating the determined hazards using the guide word mapping table of CTT based STPA using the relations between the tasks of FIGS. 5(a) and 5(b).

As explained referring to the block 106 of FIG. 1, the hazard of the target system is determined based on the specification of the tasks using CTT, after the task analysis and the hierarchical specification using CTT. Referring to FIG. 6, the control orders of the elevator control system according to the present exemplary embodiment including Stop, Open, Load Weight, Ring Alarm and Close and the hazards related to the control orders are represented according to the guide word mapping table of CTT based STPA in TABLE 2.

Referring to FIG. 6, for example, the task relation related to the safety regarding the Stop order may be Move Car>>Stop Car (Enabling of CTT) and the hazardous situation related to the task relation of Move Car>>Stop Car may be "Not Providing": the car is not stopped when the car is arrived at the destination floor or "(Provide) Too Late or Too Early": the car is stopped before the car is arrived at the destination floor. The task relation related to the safety regarding the Open order may be Stop Car>>Open doors (Enabling of CTT). The hazardous situation related to the task relation of Stop Car>>Open doors may be "Not Providing": the doors are opened before the car is stopped or the doors are not opened when the car is stopped or "(Provide) Too Late or Too Early": the doors are opened before the car is completely stopped. The task relation related to the safety regarding the Open (Hold), when the Open order is held with the doors opened, may be Hold Doors|||Get into Car (Concurrent Tasks (Interleaving)). The hazardous situation related to the task relation of Hold Doors|||Get into Car may be "Not Providing": the open status of the doors is not held when the passengers get into the car (the hold status is released when boarding). The task relations to be considered regarding the orders and the hazardous situations related to the task relations are further illustrated in FIG. 6.

FIG. 7 is a table illustrating exemplary safety constraints generated for the elevator control system based on the predicted hazardous situations of FIG. 6 for the control orders of the elevator control system.

As explained referring to the block 108 of FIG. 1, after the hazards are determined, the safety constraints considering each determined hazard is generated. Referring to FIG. 7, the safety constraints to prevent the hazards regarding the control orders including Stop, Open, Load Weight, Ring Alarm and Close are represented. Herein, the safety constraint means the requirements not to be performed in the control system to prevent the hazard. The safety constraints may be generated considering the determined and analyzed hazardous situations in FIG. 6.

Figure 8:
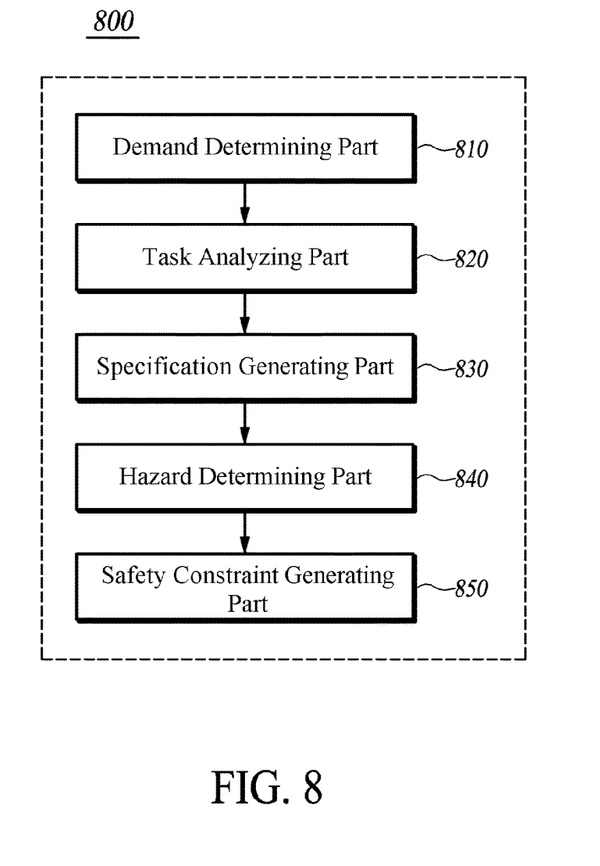
FIG. 8 describes hazard analysis apparatus according to an embodiment of the present disclosure.

FIG. 8 depicts a hazard analysis apparatus according to the present disclosure. The hazard analysis apparatus 800 includes a demand determining part 810, a task analyzing part 820, a specification generating part 830, a hazard determining part 840 and a safety constraint generating part 850. The hazard analysis apparatus 800 may include one or more processors and one or more memory modules configured to store data or instructions related to one or more other constituent elements. The demand determining part 810, the task analyzing part 820, the specification generating part 830, the hazard determining part 840 and the safety constraint generating part 850 may be program modules that may be stored in the one or more memory modules and may be executed by the one or more processors. The program modules may be in the form of operating systems, application program modules, or other program modules, while they may be physically stored on a variety of commonly known storage devices. Such program modules may include, but not limited to, routines, subroutines, programs, objects, components, instructions, data structures, and the like for performing specific tasks or executing specific abstract data types as will be described below in accordance with the present disclosure.

The demand determining part 810 determines an attribute and function demands of the system. The task analyzing part 820 analyzes tasks of the system based on the determined attribute and the function demands. The specification generating part 830 generates specification of a relation between the tasks using CTT (Concur Task Tree) method. The CTT method represents a hierarchical relation of a control flow between the tasks. The hazard determining part 840 determines at least one hazard of the system based on the specification. The safety constraint generating part 850 generates a safety constraint of the system based on the determined hazard. The hazard determining part uses a guide word mapping table of CTT based STPA.

The foregoing is illustrative of the present disclosure and is not to be construed as limiting thereof. Although a few exemplary embodiments of the present disclosure have been described, those skilled in the art will readily appreciate that many modifications are possible in the exemplary embodiments without materially departing from the novel teachings and advantages of the present disclosure. Accordingly, all such modifications are intended to be included within the scope of the present subject matter as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the appended claims. The present disclosure is defined by the following claims, with equivalents of the claims to be included therein. In addition, the various technical features in the present disclosure may be implemented by hardware, software, or a combination of hardware and software.

Accordingly, a specific part of the method of analyzing the hazard of the control software driving system may be formed as at least one of computer programs executable by a general purpose microprocessor, a dedicated microprocessor and a microcontroller. The computer program according to the present exemplary embodiments may be stored in one of storing mediums including a non-volatile memory such as EPROM, EEPROM and a flash memory device, an internal hard disk and a detachable disk, a magnetic disk, a magnetooptic disk and a CD disk. In addition, the program codes may be written in an assembly language or a machine language. The program codes may be transmitted by one of transmitting mediums including an electric wiring, a cable, an optical fiber and so on.

What is claimed is:

1. A method of analyzing a hazard of an elevator control system by a computer based on STPA (System Theoretic Process Analysis), the method comprising:
determining an attribute and function demands of the elevator control system;
analyzing tasks of the elevator control system based on the determined attribute and the function demands;

generating specification of a relation between the tasks using CTT (Concur Task Tree) method, the CTT method representing a hierarchical relation of a control flow between the tasks;

determining at least one of the hazard of the elevator control system based on the specification;

generating a safety constraint of the elevator control system based on the determined hazard; and operating an elevator car of the elevator control system based on the safety constraint, wherein the determining at least one of the hazard of the elevator control system uses a guide word mapping table of CTT based STPA.

2. The method of claim 1, wherein the determining the attribute and the function demands of the elevator control system comprising generating a use case diagram regarding the attribute and the function demands of the elevator control system.

3. The method of claim 1, further comprising generating a control structure map of the elevator control system based on the attribute and the function demands of the elevator control system prior to the analyzing the tasks of the elevator control system.

4. The method of claim 1, wherein the guide word mapping table of the CTT based STPA comprises guide words defined by the STPA corresponding to the relation between the tasks which are defined by the CTT method.

5. A non-transitory computer readable recording medium comprising at least one command, the command implementing the method of claim 1 when the command is operated by a computer.

6. The non-transitory computer readable recording medium of claim 5, wherein the determining the attribute and the function demands of the elevator control system comprising generating a use case diagram regarding the attribute and the function demands of the elevator control system.

7. The non-transitory computer readable recording medium of claim 5, further comprising generating a control structure map of the elevator control system based on the attribute and the function demands of the elevator control system prior to the analyzing the tasks of the elevator control system.

8. The non-transitory computer readable recording medium of claim 5, wherein the guide word mapping table of the CTT based STPA comprises guide words defined by the STPA corresponding to the relation between the tasks which are defined by the CTT method.

\* \* \* \* \*